United States Patent
Oishi et al.

(10) Patent No.: US 11,728,914 B2
(45) Date of Patent: Aug. 15, 2023

(54) DETECTION DEVICE, DETECTION METHOD, AND PROGRAM

(71) Applicant: NIPPON TELEGRAPH AND TELEPHONE CORPORATION, Tokyo (JP)

(72) Inventors: Yasunori Oishi, Musashino (JP); Takahito Kawanishi, Musashino (JP); Kunio Kashino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 105 days.

(21) Appl. No.: 17/310,456

(22) PCT Filed: Jan. 31, 2020

(86) PCT No.: PCT/JP2020/003670
§ 371 (c)(1),
(2) Date: Aug. 4, 2021

(87) PCT Pub. No.: WO2020/166382
PCT Pub. Date: Aug. 20, 2020

(65) Prior Publication Data
US 2022/0109517 A1   Apr. 7, 2022

(30) Foreign Application Priority Data
Feb. 13, 2019 (JP) .................................. 2019-023615

(51) Int. Cl.
*H04N 21/23* (2011.01)
*H04H 60/37* (2008.01)
(Continued)

(52) U.S. Cl.
CPC ............ *H04H 60/37* (2013.01); *G06V 20/46* (2022.01); *H04H 60/58* (2013.01); *H04H 60/59* (2013.01); *H04N 21/235* (2013.01)

(58) Field of Classification Search
None
See application file for complete search history.

(56) References Cited

U.S. PATENT DOCUMENTS

2003/0028873 A1* 2/2003 Lemmons ........ H04N 21/25883
   348/588
2009/0256972 A1* 10/2009 Ramaswamy ......... H04H 20/31
   348/738
2016/0073148 A1* 3/2016 Winograd .......... H04N 21/6582
   725/18

FOREIGN PATENT DOCUMENTS

| JP | 2014022837 A | 2/2014 |
| WO | 2008050718 A1 | 5/2008 |
| WO | 2010058509 A1 | 5/2010 |

OTHER PUBLICATIONS www.jppanet.or.jp, Retrieved on Dec. 27, 2018, from URL: http://www.jppanet.or.jp/documents/video.html.
(Continued)

*Primary Examiner* — Cai Y Chen
(74) *Attorney, Agent, or Firm* — Xsensus LLP

(57) ABSTRACT

To enable extraction of an area related to a sponsor credit from a video including the sponsor credit of a television broadcast or the like without generating learning data for each form of various kinds of sponsor credits. A detection device (10) according to the present invention includes a detection unit (19) that associates a still image including a prescribed character or figure from a preliminary video or a still image not including the prescribed character or figure with a sound signal including the prescribed sound acquired from the preliminary video so as to detect a desired scene as (Continued)

an area that includes at least one of the prescribed character or figure and the prescribed sound from the target video.

7 Claims, 8 Drawing Sheets

(51) Int. Cl.
*G06V 20/40* (2022.01)
*H04H 60/58* (2008.01)
*H04H 60/59* (2008.01)
*H04N 21/235* (2011.01)

(56) References Cited

OTHER PUBLICATIONS

Mar. 10, 2020, International Search Report issued in the International Patent Application No. PCT/JP2020/003670.

* cited by examiner

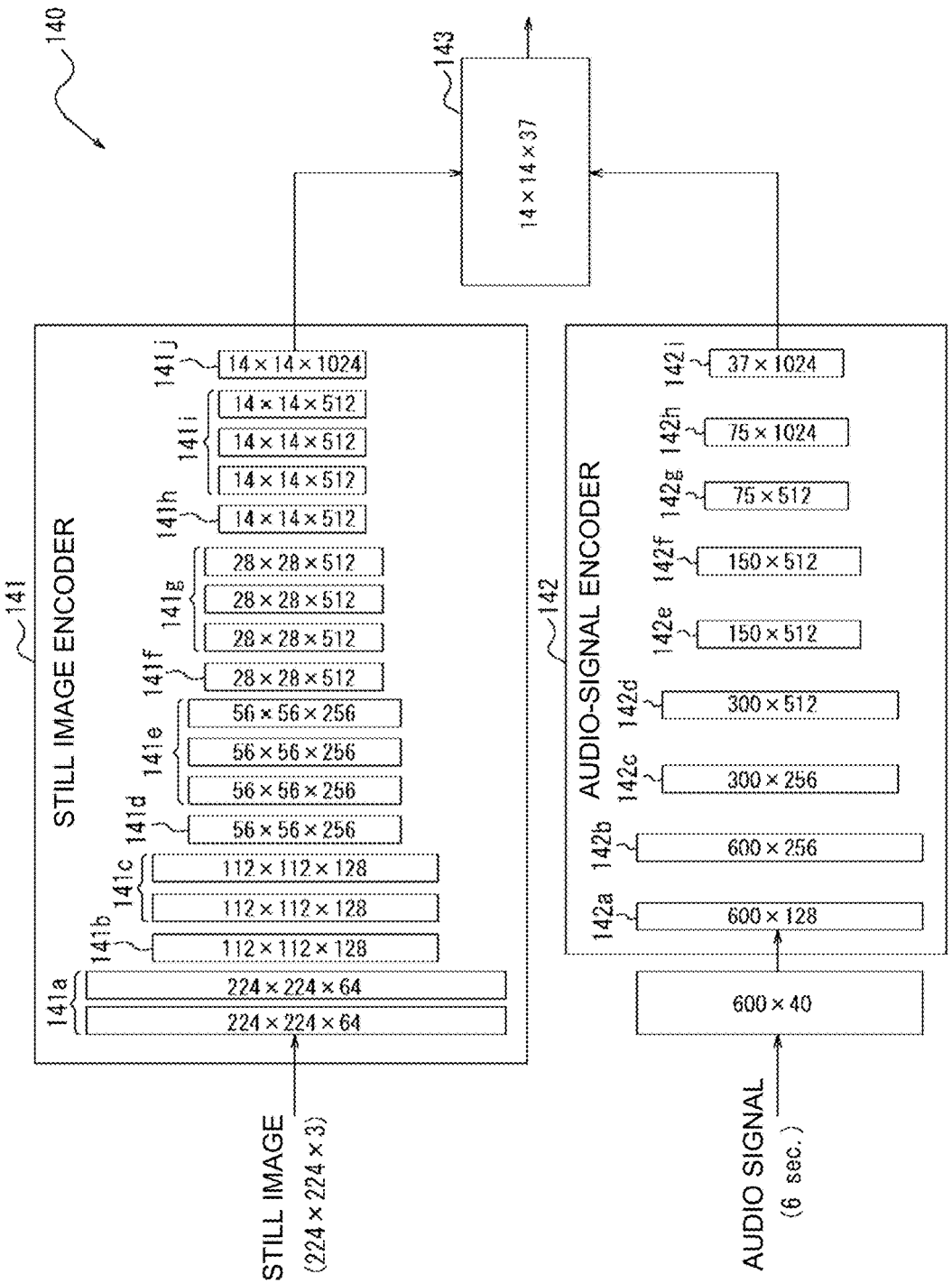

DETECTION DEVICE, DETECTION METHOD, AND PROGRAM

TECHNICAL FIELD

The present invention relates to a detection device, a detection method, and a program.

BACKGROUND ART

In a program broadcast on television and the like, there may be included a sponsor credit indicating the sponsor of the program by displaying a company logo of the sponsor of the program or by announcing the name and the like of the sponsor of the program. As for the sponsor credit, there are various forms according to display position of the company logo, character colors, use languages, and the like.

Recently, in order to evaluate the effect of commercial messages, it is desired to specify the sponsor from a sound calling out the company logo included in the sponsor credit or the name and the like of the sponsor (referred to as "company name sound" hereinafter).

Conventionally, due to versatility of the sponsor credits described above, company logos and company name sounds are used to be checked and written manually (see Non-Patent Literature 1). Such manual work leads to cost increase.

CITATION LIST

Non-Patent Literature

Non-Patent Literature 1: "CM Metadata Input Support Tool", [online], searched on Jan. 30, 2019, Internet <URL: http://www.jppanet.or.jp/documents/video.html>

SUMMARY OF THE INVENTION

Technical Problem

It is considered to automatically detect the company logos (prescribed characters or figures with which sponsors can be identified) or company name sounds (prescribed sounds with which sponsors can be identified) by using a logo recognition technology, a sound recognition technology, or the like. In order to use such recognition technologies, it is necessary to detect the position at which the company logo is displayed, the section of the company name sound, and the like. It is considered to build a model for detecting the position at which the company logo is displayed, the section of the company name sound, and the like. However, generation of learning data according to each form of various kinds of sponsor credits in order to build such a model results in cost increase.

An object of the present invention designed in view of the problem described above is to provide a detection device, a detection method, and a program capable of extracting an area related to the sponsor credit from a video including the sponsor credit of a television broadcast and the like without generating learning data for each form of various kinds of sponsor credits.

Means for Solving the Problem

In order to overcome the foregoing problem, a detection device according to the present invention is a detection device detecting a desired scene from a target video, and the detection device includes: a detection unit that associates a still image including a prescribed character or figure with an audio signal not including a prescribed sound acquired from a preliminary video or a still image not including the prescribed character or figure with an audio signal including the prescribed sound acquired from the preliminary video so as to detect the desired scene as an area including at least one of the prescribed character or figure and the prescribed sound from the target video.

Further, in order to overcome the foregoing problem, a detection device according to the present invention is a detection device detecting a scene related to a sponsor credit included in a commercial message from a target video, and the detection device includes a detection unit that associates, from a preliminary video, a still image related to the sponsor credit with an audio signal related to the sponsor credit included other than in a frame or an audio signal configuring the commercial message so as to detect the scene related to the sponsor credit from the target video.

Furthermore, in order to overcome the foregoing problem, a detection method according to the present invention is a detection method executed by a detection device that detects a desired scene from a target video, and the detection method includes: a step of associating a still image including a prescribed character or figure with an audio signal not including a prescribed sound acquired from a preliminary video or a still image not including the prescribed character or figure with an audio signal including the prescribed sound acquired from the preliminary video so as to detect the desired scene as an area including at least one of the prescribed character or figure and the prescribed sound from the target video.

Moreover, in order to overcome the foregoing problem, a program according to the present invention is a program causing a computer to function as the detection device described above.

Effects of the Invention

The detection device, the detection method, and the program according to the present invention make it possible to extract an area related to the sponsor credit from a video including the sponsor credit of a television broadcast and the like without generating learning data for each form of various kinds of sponsor credits.

BRIEF DESCRIPTION OF DRAWINGS

FIG. 3 is a diagram for describing a model used by a learning unit illustrated in FIG. 1 for learning.

DESCRIPTION OF EMBODIMENTS

Hereinafter, an embodiment of the present invention will be described with reference to the accompanying drawings.

Figure 1:
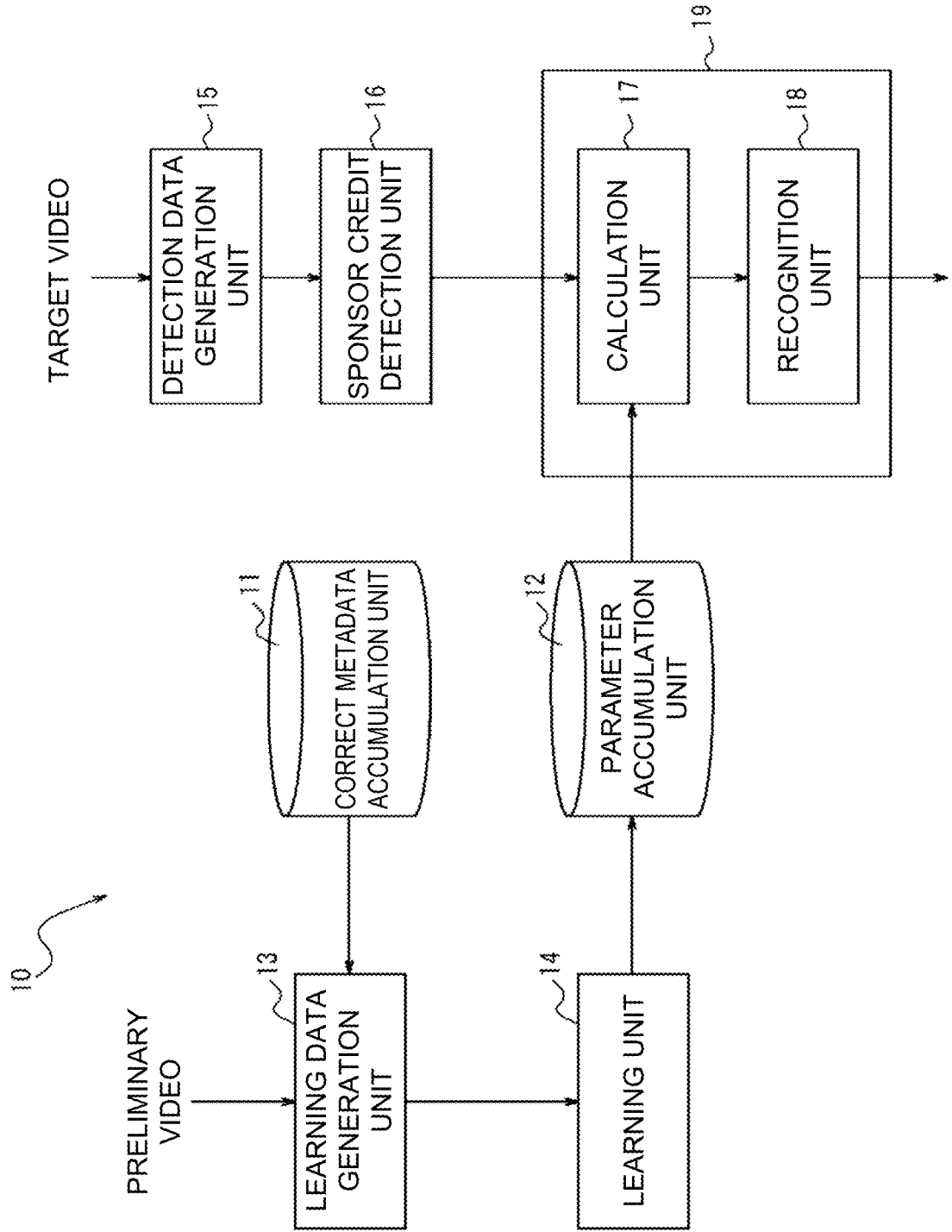
FIG. 1 is a diagram illustrating an example of a configuration of a detection device according to an embodiment of the present invention.

FIG. 1 is a diagram illustrating an example of a configuration of a detection device 10 according to the embodiment of the present invention. The detection device 10 according to the embodiment detects desired scene from a target video.

The detection device 10 illustrated in FIG. 1 includes a correct metadata accumulation unit 11, a parameter accumulation unit 12, a learning data generation unit 13, a learning unit 14, a detection data generation unit 15, a sponsor credit detection unit 16, a calculation unit 17, and a recognition unit 18. The calculation unit 17 and the recognition unit 18 configure a detection unit 19.

The correct metadata accumulation unit 11 accumulates time data of a section (referred to as "sponsor credit section" hereinafter) where a sponsor credit indicating a sponsor of a program is presented in that program. For example, the program may be a broadcast program, a program distributed on the Internet, or the like. The sponsor credit in such programs is recognized by visual inspection of a worker, for example, and time data such as start time and end time of the sponsor credit section is accumulated in the correct metadata accumulation unit 11. The sponsor credit section includes not only the section where the company logo (prescribed characters or figure with which the sponsor can be identified) is displayed and the company name sound (a prescribed sound with which the sponsor can be identified) is output but also the section only with display of the company logo as well as the section only with output of the company name sound. Hereinafter, a video from which the sponsor credit section has been detected is called a preliminary video.

The parameter accumulation unit 12 accumulates parameters applied to an association model of the company logos and the company name sounds to be described later. The association model of the company logos and company name sounds may be a model using a convolution neural network, for example. While detailed explanations thereof are omitted, the convolution neural network has a configuration in which, in general, a convolution layer and a pooling layer in this order are disposed repeatedly for a plurality of times from the input side, and then a fully connected layer is disposed. Assuming that the input for the convolution neural network is an image, processing for applying a convolution filter for the input image is performed in the convolution layer. In the pooling layer, performed is processing in which a rectangle filter is applied while being shifted sequentially to the output of the convolution layer and the maximum value within the rectangle filter is taken out, for example, to generate a new image. In the fully connected layer, performed is processing in which image data of a feature part taken out by the convolution layer and the pooling layer is connected to a single node, and a value converted by an activation function is output. In a case where the association model of the company logos and the company name sounds is a model using a convolution neural network, for example, the parameter accumulation unit 12 accumulates filter weight of the filters used in each layer, bias parameters to be added to the output of the convolution layer, and the like.

The learning data generation unit 13 receives input of a preliminary video and generates, based on the input preliminary video, learning data for learning the parameter to be applied to the association model of the company logo and the company name sound described above. Generation of the learning data by the learning data generation unit 13 will be described with reference to FIG. 2.

Figure 2:
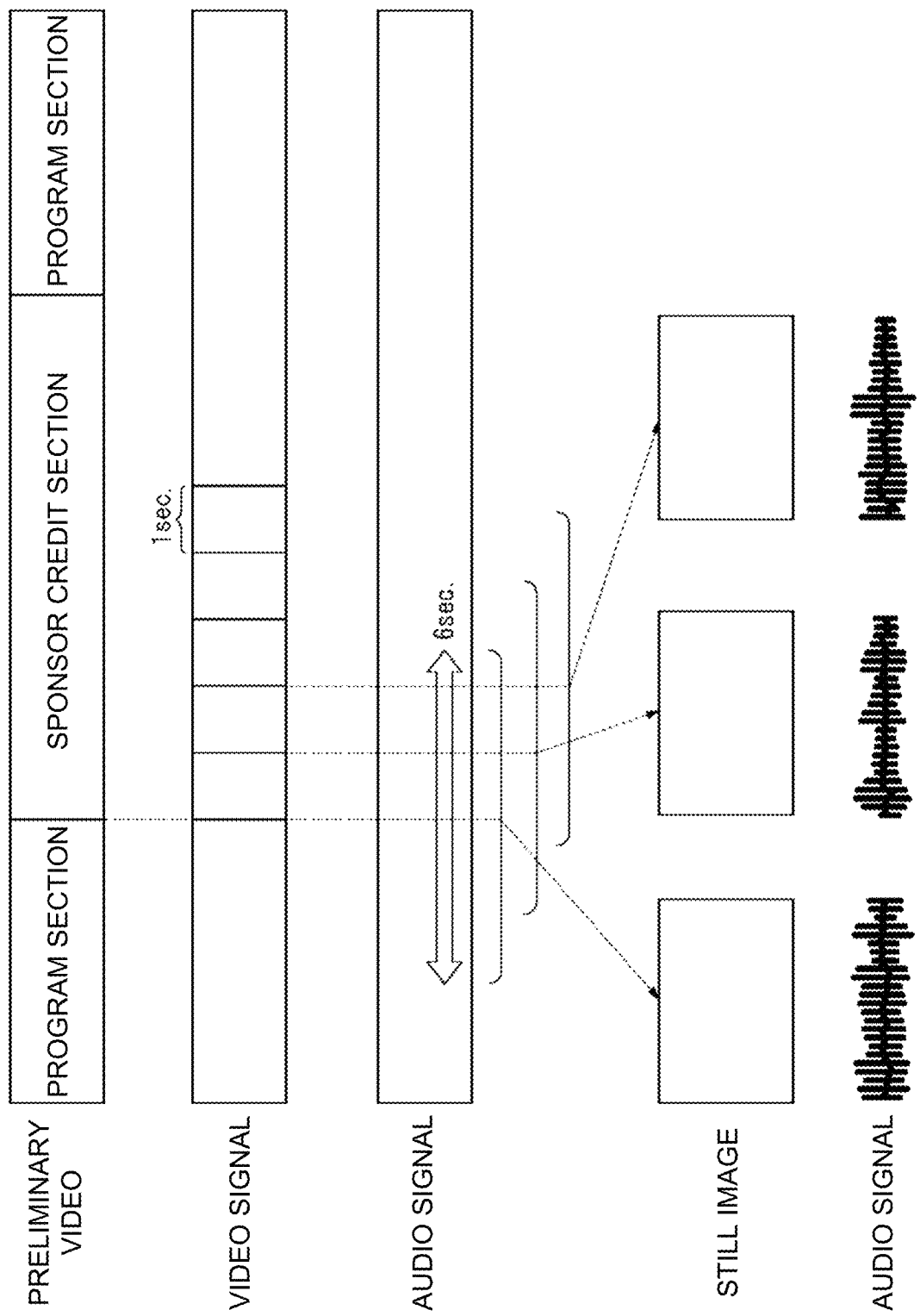
FIG. 2 is a diagram for describing generation of learning data by a learning data generation unit illustrated in FIG. 1.

As illustrated in FIG. 2, in the preliminary video, a program section and a sponsor credit section are included. The learning data generation unit 13 specifies the sponsor credit section based on the time data accumulated in the correct metadata accumulation unit 11. Then, the learning data generation unit 13 extracts a still image in the sponsor credit section from video signals of the preliminary video in a prescribed time interval (for example, 1 second interval). The learning data generation unit 13 extracts an audio signal of a prescribed time (for example, a total of 6 seconds with 3 seconds before and after) with respect to the extracted still image as the center from audio signals of the preliminary video. The learning data generation unit 13 generates a pair of extracted still image and audio signal as the learning data.

As described above, the sponsor credit section includes not only the section where the company logo is displayed and the company name sound is output but also the section only with display of the company logo a well as the section only with output of the company name sound. Therefore, the learning data generation unit 13 generates at least a pair of an still image including a company logo and an audio signal not including a company name sound and a pair of a still image not including the company logo and an audio signal including the company name sound from the preliminary video from which the company logo (prescribed characters or figure with which the sponsor can be identified) and the company name sound (a prescribed sound with which the sponsor can be identified) have been detected. Further, the learning data generation unit 13 may generate a pair of a still image including the company logo and an audio signal including the company name sound.

By using a pair of the still image including the company logo and the audio signal not including the company name sound (the audio signal of the section where the sponsor credit is not presented) and a pair of the still image not including the company name logo (the still image of the section where the sponsor credit is not presented) and the audio signal including the company name sound, it is possible to extract the latent common feature in the still images and the audio signals configuring the pairs.

While the case of extracting the still image of the sponsor credit section at 1-second interval is described in FIG. 2, the time interval is not limited thereto but an arbitrary time interval may be set to extract the still image. Further, the case of extracting the audio signal of 6 seconds with respect to the extracted still image as the center is described in FIG. 2. As for the sponsor credit, a standard announcement such as "this program is brought to you by a following sponsor" is made in many cases. The time length for extracting the audio signal may be determined according to the time of the announcement related to such sponsor credit, for example.

Referring back to FIG. 1, the learning data generation unit 13 outputs the generated learning data to the learning unit 14.

The learning unit 14 uses the learning data (a pair of the still image and the audio signal) generated by the learning data generation unit 13 to learn the parameter applied to the association model of the company logo and the company name sound. Specifically, the learning unit 14 performs learning by using the model that includes a still-image encoder (a still-image feature amount extraction unit) that extracts a feature vector as a still-image feature amount from the still image by utilizing the convolution neural network and an audio-signal encoder (an audio-signal feature amount extraction unit) that extracts a feature vector as an audio signal feature amount from the audio signal by utilizing the convolution neural network.

FIG. 3 is a diagram illustrating an example of a configuration of a model 140 used by the learning unit 14 for learning.

The model 140 illustrated in FIG. 3 includes a still-image encoder 141 and an audio-signal encoder 142.

The still-image encoder 141 includes: a convolution layer 141a; a pooling layer 141b provided at a latter stage of the convolution layer 141a; a convolution layer 141c provided at a latter stage of the pooling layer 141b; a pooling layer 141d provided at a latter stage of the convolution layer 141c; a convolution layer 141e provided at a latter stage of the pooling layer 141d; a pooling layer 141f provided at a latter stage of the convolution layer 141e; a convolution layer 141g provided at a latter stage of the pooling layer 141f; a pooling layer 141h provided at a latter stage of the convolution layer 141g; a convolution layer 141i provided at a latter stage of the pooling layer 141h; and a convolution layer 141j provided at a latter stage of the convolution layer 141i.

In FIG. 3, it is assumed that there are 224 pixels in the row direction and in the column direction of the still image extracted as the learning data. Assuming that the still image extracted as the learning data is configured with three colors of RGB, an image in a size of 224×224 is input to the convolution layer 141a in three channels.

The convolution layer 141a performs convolution processing on each prescribed area of the input still image by each of a plurality of filters to extract the feature amounts. The convolution layer 141a generates an image in which the feature amounts extracted by the convolution processing by sliding the filters are mapped at corresponding positions (a feature map), and outputs it to the pooling layer 141b at a latter stage. For example, assuming that the convolution processing is performed with 64 filters, the convolution layer 141a generates and outputs 64 feature maps of 224×224 pixels. In that case, the output of the convolution layer 141a can be expressed as 224×224×64. The feature amount extracted by the convolution layer 141a is expressed as a feature vector, and the number of dimensions of the feature vector is 64 in the above-described case.

The pooling layer 141b compresses the feature map by taking the maximum value or the mean value within the area of every prescribed size (for example, every 2×2 pixels) of the image output from the convolution layer 141a of the previous stage, and outputs it to the convolution layer 141c at the latter stage. The output of the pooling layer 141b is expressed as 112×112×128, for example. Hereinafter, the same processing is performed in the convolution layers 141c, 141e, 141g, 141i, 141j and the pooling layers 141d, 141f, 141h. While a specific example of the output of each layer is written in the block indicating each layer, the present invention is not limited thereto.

The still-image encoder 141 outputs an output image (a feature vector set) of the convolution layer 141j of the last stage. Hereinafter, it is assumed that the still-image encoder 141 outputs the feature vector set expressed as $N_r \times N_c \times N_d$. $N_r$ and $N_c$ are the number of pixels in the row direction and the column direction of the output image of the still-image encoder 141, respectively, and $N_d$ is the number of dimensions of the feature vector.

The audio-signal encoder 142 includes: a convolution layer 142a; a convolution layer 142b provided at a latter stage of the convolution layer 142a; a pooling layer 142c provided at a latter stage of the convolution layer 142b; a convolution layer 142d provided at a latter stage of the pooling layer 142c; a pooling layer 142e provided at a latter stage of the convolution layer 142d; a convolution layer 142f provided at a latter stage of the pooling layer 142e; a pooling layer g provided at a latter stage of the convolution layer 142f; a convolution layer 142h provided at a latter stage of the pooling layer 142g; and a pooling layer 142i provided at a latter stage of the convolution layer 142.

The learning unit 14 applies mel filter bank processing with 40 filters by performing a frequency analysis (for example, window length of 25 ms and window shift length of 10 ms) on the audio signal configuring a pair. Thereby, the audio signal is expressed with a mel spectrogram of 600×40.

The convolution layer 142a performs convolution processing on each prescribed section of the input mel spectrogram by each of a plurality of filters to extract the feature amounts. The convolution layer 141a generates a feature map in which the feature amounts extracted by the convolution processing by sliding the filters are mapped at corresponding position, and outputs it to the convolution layer 142b at a latter stage. For example, assuming that the convolution layer 142 performs the convolution processing with 128 filters, the output of the convolution layer 142 can be expressed as 600×128. The feature amount extracted by the convolution layer 142a is expressed as a feature vector, and the number of dimensions of the feature vector is 128 in the above-described case.

The convolution layer 142b extracts the feature amount of the mel spectrogram (audio signal) output from the convolution layer 142a and outputs it to the pooling layer 142c with the same processing as that of the convolution layer 142.

The pooling layer 142c compresses mel spectrogram output from the convolution layer 142b, and outputs it to the convolution layer 142d of the latter stage. The output of the pooling layer 142c is expressed as 300×256, for example. Hereinafter, the same processing is performed in the convolution layers 142d, 142f, 142h and the pooling layers 142e, 142g, 141i. While a specific example of the output of each layer is written in the block indicating each layer, the present invention is not limited thereto.

The audio-signal encoder 142 outputs a mel spectrogram (a feature vector set) output from the pooling layer 141i of the last stage. Hereinafter, it is assumed that the audio-signal encoder 142 outputs the feature vector set expressed as $N_t \times N_d$. Note here that $N_t$ is the length of the output audio signal (audio signal corresponding to the mel spectrogram) of the audio-signal encoder 142, and $N_d$ is the number of dimensions of the feature vector.

The model 140 further includes a connected layer 143. The connected layer 143 outputs the inner product of the output of the still-image encoder and the output of the audio-signal encoder.

Assuming that the mini-batch size is B, the learning unit 14 learns the parameter of the still-image encoder 141 and the audio-signal encoder 142 (the convolutional neural network) by using the pairs of the still images and the audio signals generated as the learning data and using stochastic gradient descent such that the value of following Expression (1) becomes minimum. Note that mini-batch size B is the number of data pieces (pairs of the still images and audio signals) used for updating the parameter.

[Math. 1]

$$\text{Loss}_{rank} = \Sigma_{j=1}^{B} (\max(0, S(I_j, A_j^{imp}) - S(I_j, A_j) + 1) + \max(0, S(I_j^{imp}, A_j) - S(I_j, A_j) + 1))$$

Expression (1)

In Expression (1), $I_j$ and $A_j$ are outputs of the still-image encoder 141 and the audio-signal encoder 142, respectively, for the pair of the j-th still image and audio signal, $I_j^{imp}$ and $A_j^{imp}$ are outputs of the still-image encoder 141 and the audio-signal encoder 142, respectively, for the pair of the still image and the audio signal selected randomly in the j-th order from the mini batch (data used for updating the parameter), and S($I_j$, $A_j$) is the similarity between the output $I_j$ of the still-image encoder 141 and the output $A_j$ of the audio-signal encoder 142. In Expression (1), max function is used for satisfying such a standard that the similarity calculated based on the still image and the audio signal configuring a pair is larger than the similarity calculated based on the still image and the audio signal not configuring a pair (the similarity calculated by replacing either the output of the still-image encoder 141 or the output of the audio-signal encoder 142 with another value).

As the calculation method of the similarity S ($I_j$, $A_j$), there are following five calculation methods, for example. Hereinafter, the similarity calculated by the first calculation method is defined as $S_1(M)$, the similarity calculated by the second calculation method is defined as $S_2(M)$, the similarity calculated by the third calculation method is defined as $S_3(M)$, the similarity calculated by the fourth calculation method is defined as $S_4(M)$, and the similarity calculated by the fifth calculation method is defined as $S_5(M)$. Each of the similarity $S_1(M)$, the similarity $S_2(M)$, the similarity $S_3(M)$, the similarity $S_4(M)$, and the similarity $S_5(M)$ is calculated based on following Expression (2) to Expression (7).

[Math. 2]

$$M_{r,c,t} = \sum_{d=1}^{N_d} I_{r,c,d} A_{t,d} \quad \text{Expression (2)}$$

$$S_1(M) = \frac{1}{N_r N_c N_t} \sum_{r=1}^{N_r} \sum_{c=1}^{N_c} \sum_{t=1}^{N_t} M_{r,c,t} \quad \text{Expression (3)}$$

$$S_2(M) = \frac{1}{N_t} \sum_{t=1}^{N_t} \max_{r,c} (M_{r,c,t}) \quad \text{Expression (4)}$$

$$S_3(M) = \frac{1}{N_r N_c} \sum_{r=1}^{N_r} \sum_{c=1}^{N_c} \max_{t} (M_{r,c,t}) \quad \text{Expression (5)}$$

$$S_4(M) = \max_{r,c,t} (M_{r,c,t}) \quad \text{Expression (6)}$$

$$S_5(M) = \left( \frac{1}{N_r N_c N_t} \sum_{r=1}^{N_r} \sum_{c=1}^{N_c} \sum_{t=1}^{N_t} M_{r,c,t}^p \right)^{1/p} \quad \text{Expression (7)}$$

Note here that $I_{r,c,d}$ is an output element of the still-image encoder 141, and $A_{t,d}$ is an output element of the audio-signal encoder 142. Further, p is the parameter that is set by learning.

The learning unit 14 calculates one of the similarity $S_1(M)$, the similarity $S_2(M)$, the similarity $S_3(M)$, the similarity $S_4(M)$, and the similarity $S_5(M)$, and learns the parameters of the still-image encoder 141 and the audio-signal encoder 142 with which the value of Expression (1) becomes the minimum. Note that the learning unit 14 may put weight on the parameter so as to give priority over either the output of the still-image encoder 141 or the output of the audio-signal encoder 142. That is, it is possible to put weight on the similarity to give priority over either the still-image feature amount extracted by the still-image encoder 141 or the audio feature amount extracted by the audio-signal encoder 142. Such weighting is possible by selecting the expression (for example, Example (3) to Example (7)) used for calculating the above-described similarity S($I_j$, $A_j$), for example. Note here that Expression (7) is assumed to be capable of learning the parameter p described above. According to the value of the parameter p, it is possible to determine whether to focus on the output of the still-image encoder 141 or on the output of the audio-signal encoder 142. In Expression (3) to Expression (6), the value of the parameter p is fixed (for example, Expression (3) corresponds to a case of p=1 and Expression (6) corresponds to a case of p=∞). Thus, in Expression (3) to Expression (6), either the output of the still-image encoder 141 or the output of the audio-signal encoder 142 is focused, or both are evaluated equivalently. Therefore, by using Expression (7), it is possible to optimize whether to focus on the output of the still-image encoder 141 or on the output of the audio-signal encoder 142 according to the learning state of the learning data.

Referring back to FIG. 1, the learning unit 14 accumulates the acquired parameters in the parameter accumulation unit 12.

While it has been described heretofore by referring to the case where the learning unit 14 learns the parameter to satisfy such a standard that the similarity calculated based on the still image and the audio signal configuring a pair is larger than the similarity calculated based on the still image and the audio signal not configuring a pair, the present invention is not limited thereto. The learning unit 14 may use some kind of evaluation values (values with which some kind of likelihood can be acquired) instead of the similarity. The still-image encoder 141 and the audio-signal encoder 142 are designed such that the evaluation value acquired from the still-image feature amount extracted from the still image including prescribed characters or figure acquired from a preliminary video and the audio feature amount extracted from the audio signal not including a prescribed sound or the evaluation value acquired from the still-image feature amount extracted from the still image not including the prescribed characters or figure and the audio feature amount acquired from the audio signal including the prescribed sound acquired from the preliminary video becomes high. More specifically, the still-image encoder 141 and the audio-signal encoder 142 are designed such that those evaluation values become higher than the evaluation value of the still-image feature amount and the audio feature amount extracted from the still image and the audio signal not configuring a pair.

While a co-occurrence relation between the still image and the audio signal related to the sponsor credit is estimated in the embodiment by using machine learning, the present invention is not limited thereto. For example, the co-occurrence relation of the still image and the audio signal related to the sponsor credit may be estimated heuristically by using a statistic characteristic of a learning data group generated by the learning data generation unit 13 described above. Further, the still-image encoder 141 and the audio-signal encoder 142 may use not machine learning but a linear function or the like, which lowers the dimension of the input data.

To the detection data generation unit 15, the program (referred to as "target video" hereinafter) as a target for detecting a desired scene that is an area including at least one of the company logo and the company name sound is input. The detection data generation unit 15 extracts an audio signal with the window length of 6 seconds and the window shift length of 1 second from the audio signal of the input target video. Further, the detection data generation unit 15 extracts a still image at the center time of the section of the extracted audio signal (at the time 3 seconds from the start of the extracted audio signal) from the video signal of the target video. The detection data generation unit 15 outputs, to the sponsor credit detection unit 16, a pair of the extracted still image and the audio signal as the detection data. While the case of using a pair of the still image and the audio signal as the detection data is described in the embodiment, the present invention is not limited thereto. Only either the still image or the audio signal of the target video may be used as the detection data.

The sponsor credit detection unit 16 detects the sponsor credit section of the target video by using the detection data generated by the detection data generation unit 15.

The sponsor credit detection unit 16 is capable of detecting the sponsor credit section (the section where the company logo is displayed) by using, as learning data, a model generated by using the still image including the sponsor credit display and the still image not including the sponsor credit display generated from the program where display of the company logo (sponsor credit display) has been detected, for example.

Further, in a case where the sponsor credit detection unit 16 extracts a related phrase (for example, "watching", "program", "sponsor", "present", "brought", or the like) included in the announcement of the sponsor credit by voice recognition for the voice of the target video and estimates a prescribed period from the appearing time of the related phrase is assumed as a sponsor credit section, and when the section assumed as the sponsor credit section continues for a prescribed time or more, the sponsor credit detection unit 16 can detect such a section as the sponsor credit section.

The sponsor credit detection unit 16 outputs, to the calculation unit 17, a pair of the still image and the audio signal in the detected sponsor credit section.

The calculation unit 17 builds an association model of the company logo and the company name sound by substituting the parameter accumulated in the parameter accumulation unit 12 to the model 140 described by referring to FIG. 2. The calculation unit 17 inputs, to the built association model of the company logo and the company name sound, a pair of the still image and the audio signal of the sponsor credit section output from the sponsor credit detection unit 16 so as to acquire the output $I_{r,c,d}$ of the still-image encoder 141 and the output $A_{t,d}$ of the audio-signal encoder 142.

The calculation unit 17 substitutes the acquired output $I_{r,c,d}$ of the still-image encoder 141 and output $A_{t,d}$ of the audio-signal encoder 142 into following Expression (8) to Expression (10) to calculate the values.

[Math. 3]

$$M_{r,c,t} = \sum_{d=1}^{N_d} I_{r,c,d} A_{t,d} \quad \text{Expression (8)}$$

$$I_{r,c}^{sim} = \max_{t}(M_{r,c,t}) \quad \text{Expression (9)}$$

$$A_{t}^{sim} = \max_{r,c}(M_{r,c,t}) \quad \text{Expression (10)}$$

Figure 4A:
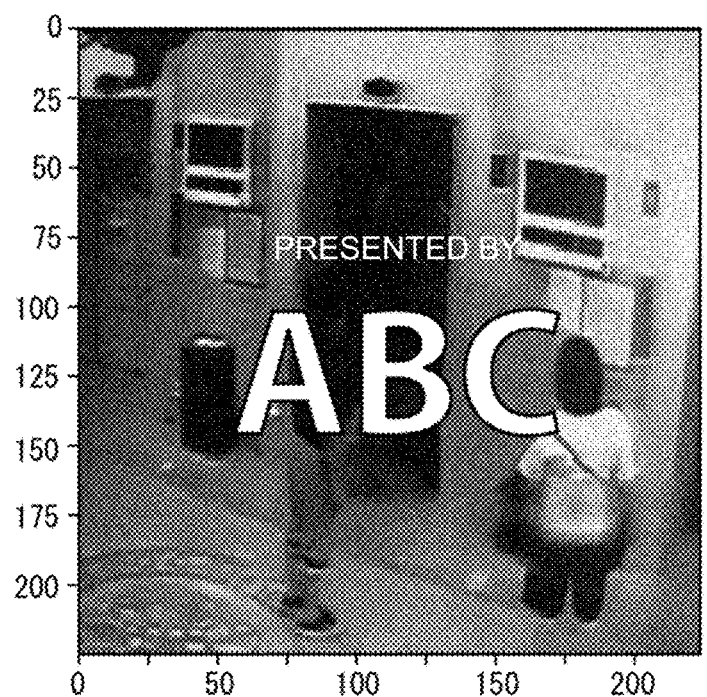
FIG. 4A is a picture presenting an example of a still image including a company logo.

FIG. 4A is a picture presenting an example of a still image displaying a company logo. FIG. 4A presents a case where a company logo "ABC" is displayed in outline characters in the center of the screen by being superimposed on a background image.

Figure 4B:
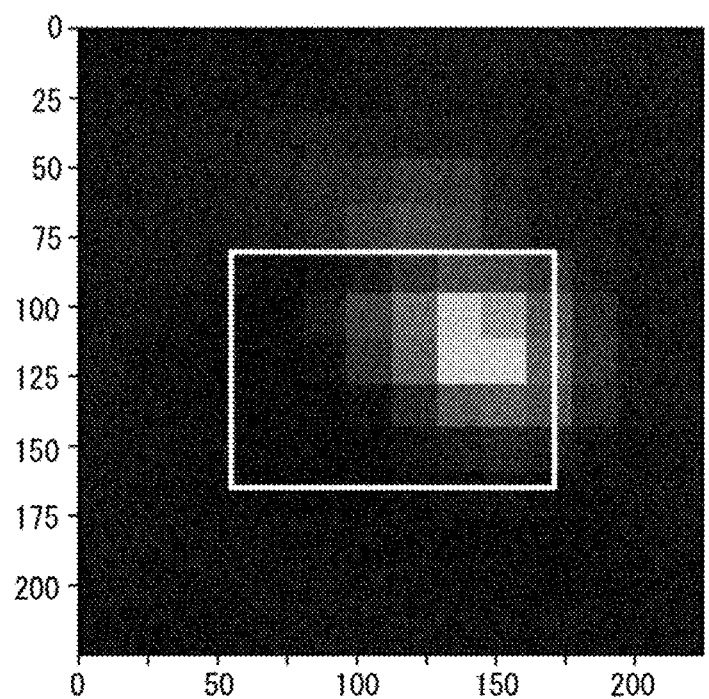
FIG. 4B is a picture of visualized output of a still-image encoder to which the still image of FIG. 4A is input.

FIG. 4B is a picture presenting the visualized output $I_{r,c,d}$ of the still-image encoder 141 to which the still image of FIG. 4A is input. In FIG. 4B, the area corresponding to the area where the company logo is displayed in the still image of FIG. 4A is presented with a white line. As in FIG. 4B, almost the center area of the image where the output $I_{r,c,d}$ of the still-image encoder 141 is visualized is detected as the company logo, and that area almost matches the area where the company logo is displayed in the still image of FIG. 4A (the area presented with a white line). Therefore, it can be found that the area including the company logo (the position where the company logo is displayed) in the target video can be detected from the output $I_{r,c,d}$ of the still-image encoder 141.

Figure 4C:
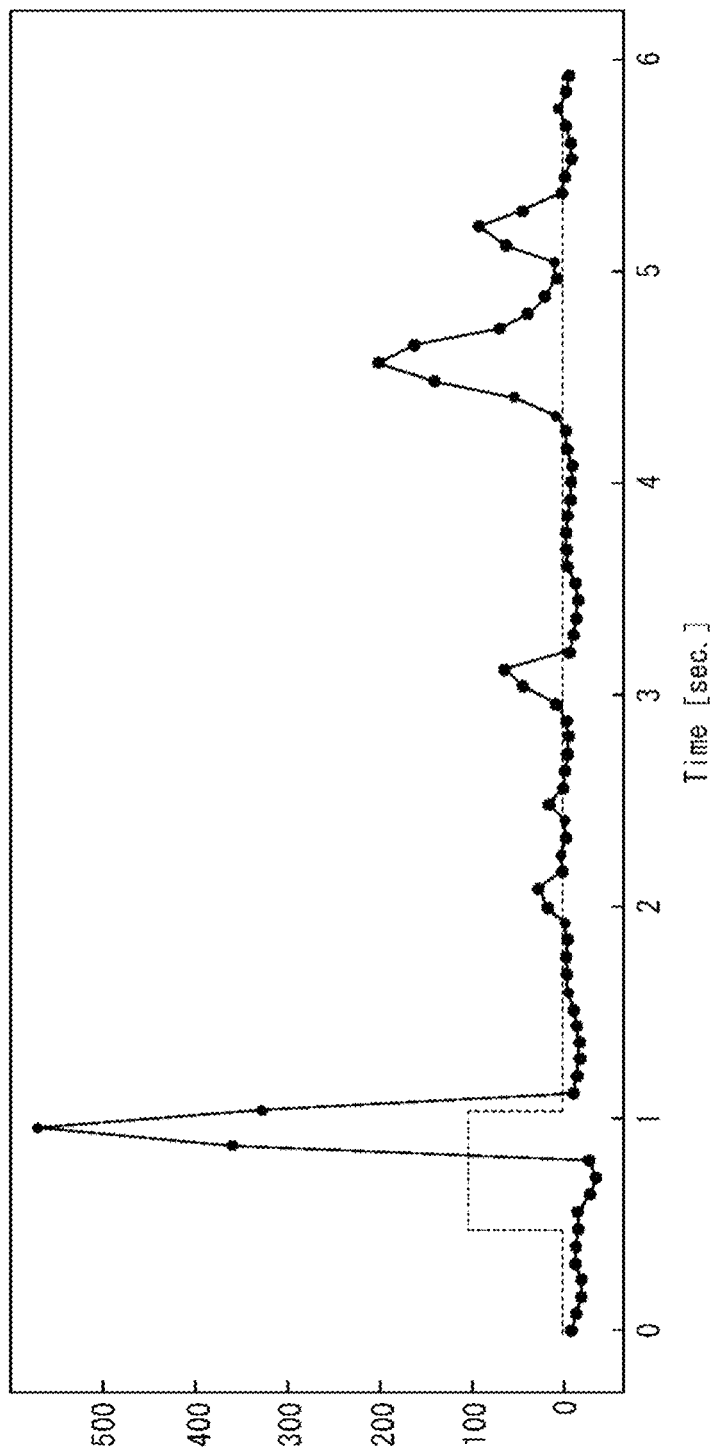
FIG. 4C is a chart presenting visualized output of an audio-signal encoder to which an audio signal as a pair with the still image illustrated in FIG. 4A is input.

FIG. 4C is a chart that visualizes the output $A_{t,d}$ of the audio-signal encoder 142 to which the audio signal as a pair with the still image of FIG. 4A is input. FIG. 4C presents the timing at which the company name sound is output with a broken line, indicating a case where the company name sound is output in a period of about 0.5 second to 1 second after the start of the audio signal. As in FIG. 4C, the output $A_{t,d}$ of the audio-signal encoder 142 indicates a high peak before and after about 1 second from the start of the audio signal, and it almost matches the timing at which the company name sound is output. Therefore, it can be found that the area including the company name sound (the section where the company name sound is output) of the target video can be detected from the output $A_{t,d}$ of the audio-signal encoder 142.

Referring back to FIG. 1, the calculation unit 17 outputs the calculated $I_{r,c}^{sim}$ and $A_{t}^{sim}$ to the recognition unit 18.

The recognition unit 18 performs thresholding on $I_{r,c}^{sim}$ and $A_{t}^{sim}$ output from the calculation unit 17, and detects a desired scene as an area including the company logo (the position at which the company logo is displayed) in the target video and as an area including the company name sound (the section where the company name sound is output) in the target video. The recognition unit 18 detects at least one of the company logo and the company name sound from the specified area by using an existing object recognizer, a voice recognizer, and the like.

As described above, the calculation unit 17 and the recognition unit 18 configure the detection unit 19. Therefore, the detection unit 19 detects a desired scene as an area including at least one of a prescribed character or figure and a prescribed sound from the target video by associating the still image including the prescribed characters or figure acquired from the preliminary video with the audio signal not including the prescribed sound or associating the still image not including the prescribed characters or figure acquired from the preliminary video with the audio signal including the prescribed sound. More specifically, the detection unit 19 detects a desired scene including at least one of the company logo (prescribed characters or figure with which the sponsor can be identified) and the company name sound (prescribed sound with which the sponsor can be identified) from the target video by using the model (the association model of the company logo and the company name sound) that is built by using the still image including the prescribed characters or figure and the audio signal not including the prescribed sound acquired from the preliminary video or the still image not including the prescribed characters or figure and the audio signal including the prescribed sound acquired from the preliminary video.

The recognition unit 18 may detect, from the target video, a section where a prescribed number or more of still images including the company logo continue or a section where the company name sound continues for a prescribed time or more. Thereby, the area including the company logo or the company name sound can be detected in the target video more securely.

Further, the recognition unit 18 may detect information regarding the start time and the end time of the section where the prescribed number or more of still images including the company logo continue or the section where the company name sound continues for a prescribed time or more. The start time and the end time may be detected by processing, in a time series order, the detection data generated by the detection data generation unit 15, for example.

Figure 5:
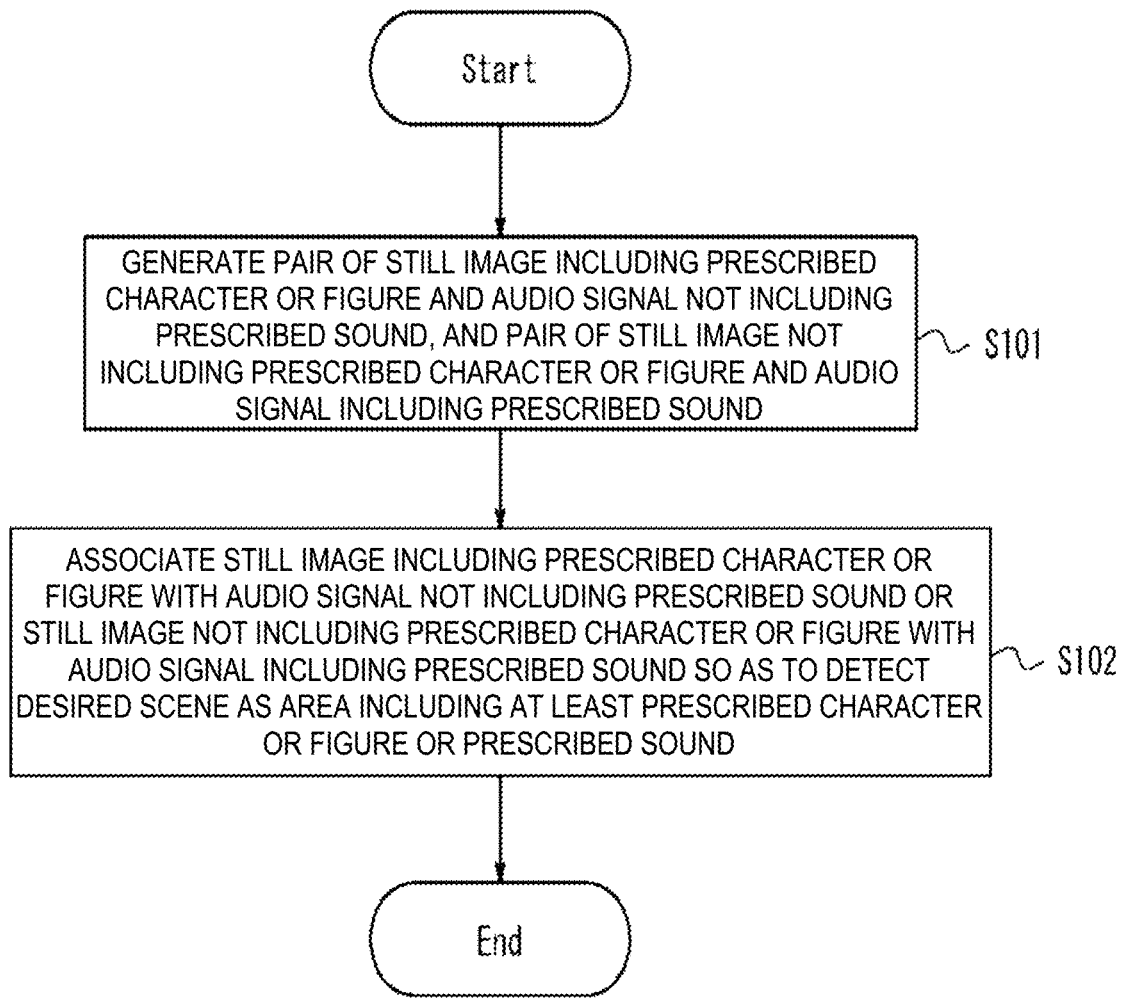
FIG. 5 is a flowchart for describing a detection method executed in the detection device illustrated in FIG. 1.

Next, a detection method executed by the detection device 10 according to the embodiment will be described by referring to the flowchart illustrated in FIG. 5.

The learning data generation unit 13 generates, from a preliminary video, a pair of a still image including prescribed characters or figure and an audio signal not including a prescribed sound (company name sound) and a pair of a still image not including the prescribed characters or figure and an audio signal including the prescribed sound (step S101).

The detection unit 19 associates the still image including the prescribed characters or figure with the audio signal not including the prescribed sound or the still image not including the prescribed characters or figure with the audio signal including the prescribed sound acquired from the preliminary video generated by the learning data generation unit 13 so as to detect a desired scene that is an area including at least one of the prescribed character or figure and the prescribed sound from the target video (step S102).

Figure 6:
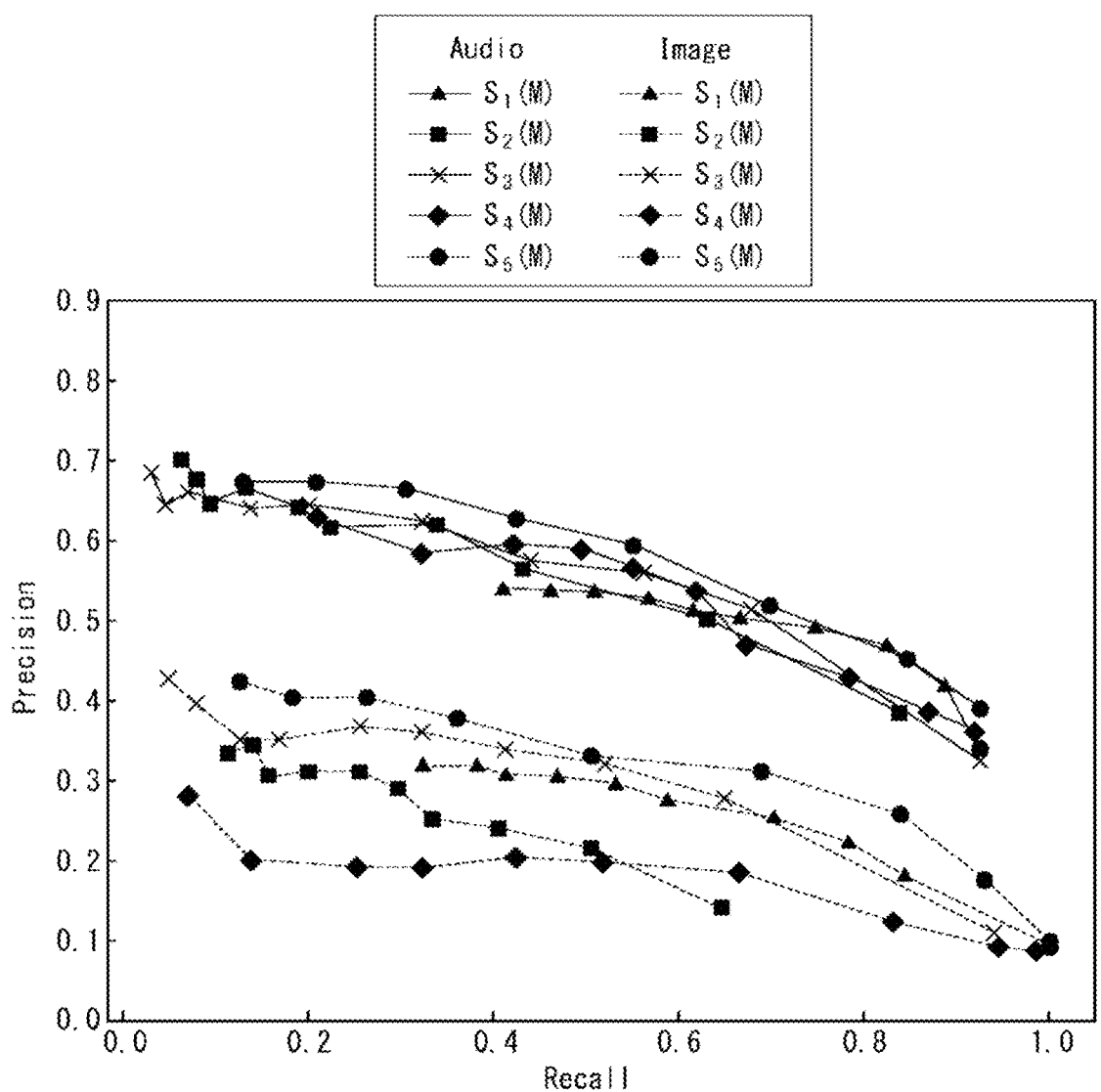
FIG. 6 is a chart illustrating an example of an evaluation result of detection accuracy of the detection device illustrated in FIG. 1.

FIG. 6 is a chart indicating the detection result of the area including the company logo and the company name sound acquired by the association model of the company logo and the company name sound to which the parameters learned by using each of the above-described similarity $S_1(M)$, similarity $S_2(M)$, similarity $S_3(M)$, similarity $S_4(M)$, and similarity $S_5(M)$ is applied. In FIG. 6, the vertical axis represents Precision, and the horizontal axis represents Recall. Precision is the ratio of the properly detected sponsor credits among those detected as the sponsor credits (company name logo and company name sound). Further, Recall is the ratio of the actually detected sponsor credits among the sponsor credits to be detected. Precision and Recall regarding the company logo can be expressed in binary form (0/1) by performing thresholding on $I_{r,c}^{sim}$, and calculated by comparing it with the display area of the actual company logo by each pixel. Further, Precision and Recall regarding the company name sound can be expressed in binary form by performing thresholding on $A_t^{sim}$, and calculated by comparing it with the section of the actual company name sound.

As illustrated in FIG. 6, as for the audio signal (Audio), almost the same level of accuracy is acquired in each of the similarities S(M). For the images (Image), particularly high accuracy is acquired when the similarity $S_5(M)$ is used.

In the embodiment described above, the detection device 10 includes the detection unit 19 that associates a still image including prescribed characters or figure with an audio signal not including a prescribed sound acquired from a preliminary video or a still image not including the prescribed characters or figure with an audio signal including the prescribed sound acquired from the preliminary video so as to detect a desired scene that is an area including at least one of the prescribed character or figure and the prescribed sound from the target video.

By associating the still image including the prescribed characters or figure (company logo) with the audio signal not including the prescribed sound (company name sound) or the still image not including the prescribed characters or figure with the audio signal including the prescribed sound, it is possible to extract the corresponding relation (co-occurrence) of the display of the company logo and the announcement of the company name sound so as to detect the desired scene that is the area including the company logo or the company name sound from the target video. Further, since it is unnecessary to generate the learning data corresponding to each form of various kinds of sponsor credits, cost increase can be suppressed.

The present invention can also be applied to detect the sponsor credit section. In that case, the detection device 10 according to the embodiment may include the detection unit 19 that detects the scene regarding the credit from the target video by associating, from the preliminary video, a still image related to the credit with an audio signal related to the credit included other than in a frame or an audio signal configuring a commercial message.

More specifically, the output $I_{r,c,d}$ of the still-image encoder 141 and the output $A_{t,d}$ of the audio-signal encoder 142 are considered as latent variables in common to the still image and the audio signal. Then, two classes of discriminators (neural network, SVM (Support Vector Machine)) are learned by utilizing the outputs of the still-image encoder 141 and the audio-signal encoder 142 in the sponsor credit section and the outputs of the still-image encoder 141 and the audio-signal encoder 142 in the sections other than the sponsor credit section. The detection unit 19 can identify whether or not it is the sponsor credit section by using the discriminators for the output of the encoders acquired from a new still image and audio signal. In the experiment result, accuracy of 97.7% in Recall and 68.0% in Precision was observed, and Precision was improved (misdetection was suppressed) compared to the discriminators using the features acquired from the still image or the audio signal alone.

While the case of including the timing at which the still image is displayed in the section of the audio signal is described in the embodiment above in regards to the still image and the audio signal as a pair, the present invention is not limited thereto.

The learning data generation unit 13 may generate as learning data, from a preliminary video, a pair of a still image including prescribed characters or figure and an audio signal not including a prescribed sound, and a pair of a still image not including the prescribed characters or figure and an audio signal including the prescribed sound, in which the still image to be the pair with the audio signal is not included in the section of the audio signal. That is, the learning data generation unit 13 may generate, as the learning data, a pair of a still image and an audio signal not overlapping with each other in terms of time. In that case, the detection unit 19 detects an area including at least one of a prescribed character or figure and a prescribed sound from the target video by using the model learned by using a pair of a still image and an audio signal not overlapping with each other in terms of time generated by the learning data generation unit 13.

In a program, in a commercial section or a section where a product is introduced within the program other than a sponsor credit section, the "product" and "name of the product" may appear on the video and sound of the program. The learning data generation unit 13 generates a pair of a still image and an audio signal from such sections. The learning data generation unit 13 generates, for example, a pair of a still image including the product and an audio signal not including the name of the product and not overlapping with the still image including the product in terms of time, and a pair of a still image not including the product and an audio signal including the name of the product and not overlapping with the still image not including the product in terms of time. Even though the learning data does not include the sponsor credit itself, it is also possible to detect the company name, that is, the sponsor credit, if the product or the name of the product can be specified. Thus, by using a pair of the still image and the audio signal not overlapping with each other in terms of time, it is also possible to detect an area including at least one of a prescribed character or figure and a prescribed sound from the target video.

While the detection device 10 is described heretofore, it is also possible to use a computer to function as the detection device 10. Such a computer can be implemented by storing a program in which the processing content for implementing each function of the detection device 10 is written in a storage unit of the computer, and reading and executing the program by the CPU of the computer.

Further, the program may be recorded in a computer-readable recording medium. By the use of such a recording medium, it is possible to install the program to the computer. Note here that the recording medium in which the program is recorded may be a non-transitory recording medium. While there is no specific limit set for the non-transitory recording medium, examples thereof may be a CD-ROM, a DVD-ROM, and the like.

While the embodiment above is described as a typical example, it is obvious to those skilled in the art that many changes and substitutions are possible within the gist and scope of the present invention. Therefore, it is to be noted that the present invention is not limited by the embodiment described above but various modifications and changes are possible without departing from the scope of the appended claims. For example, it is possible to combine a plurality of structural blocks illustrated in the block diagram of the embodiment into one or to divide a single structural block.

REFERENCE SIGNS LIST

10 Detection device
11 Correct metadata accumulation unit
12 Parameter accumulation unit
13 Learning data generation unit
14 Learning unit
15 Detection data generation unit
16 Sponsor credit detection unit
17 Calculation unit
18 Recognition unit
19 Detection unit
140 Model
141 Still-image encoder (still-image feature amount extraction unit)
142 Audio-signal encoder (audio-signal feature amount extraction unit)
141a, 141c, 141e, 141g, 141i, 141j, 142a, 142b, 142d, 142f, 142h Convolution layer
141b, 141d, 141f, 141h, 141j, 142c, 142e, 142g, 142i Pooling layer
143 Connected layer

The invention claimed is:

1. A detection device detecting a desired scene from a target video, the detection device comprising:
 a detector that associates a still image including a prescribed character or figure with an audio signal not including a prescribed sound acquired from a preliminary video or a still image not including the prescribed character or figure with an audio signal including the prescribed sound acquired from the preliminary video so as to detect the desired scene as an area including at least one of the prescribed character or figure and the prescribed sound from the target video, wherein the detector comprises:
 a still-image encoder that extracts a still-image feature amount from the still image; and
 an audio-signal encoder that extracts an audio feature amount from the audio signal, and
 the still-image encoder and the audio-signal encoder are designed such that an evaluation value acquired from the still-image feature amount that is extracted from the still image including the prescribed character or figure and the audio feature amount that is extracted from the audio signal not including the prescribed sound acquired from the preliminary video or an evaluation value acquired from the still-image feature amount that is extracted from the still image not including the prescribed character or figure and the audio feature amount that is acquired from the audio signal including the prescribed sound acquired from the preliminary video becomes high,
 and wherein the evaluation value is similarity of the still-image feature amount and the audio feature amount; and
 the similarity is calculated based on following Expression (1):

[Math. 1]

$$S_5(M) = \left( \frac{1}{N_r N_c N_t} \sum_{r=1}^{N_r} \sum_{c=1}^{N_c} \sum_{t=1}^{N_t} M_{r,c,t}^p \right)^{1/p}. \quad \text{Expression (1)}$$

2. The detection device according to claim 1, wherein the detector detects, in the target video, a section where a prescribed number or more of the still images including the prescribed character or figure continue or a section where the prescribed sound continues for a prescribed time or more.

3. The detection device according to claim 2, wherein the detector detects information regarding start time and end time of the section.

4. The detection device according to claim 1, wherein:
 the prescribed character or figure is a character or figure with which a sponsor of a program can be identified;
 the prescribed sound is a sound with which the sponsor can be identified; and
 the detector detects, as the area, at least one of the still image including the prescribed character or figure out of still images configuring the target video and a section where the prescribed sound is output in the target video.

5. The detection device according to claim 1, wherein the similarity is weighted to give priority over either the still-image feature amount or the audio feature amount.

6. A detection method executed by a detection device that detects a desired scene from a target video, the detection method comprising: a step of associating a still image including a prescribed character or figure with an audio signal not including a prescribed sound acquired from a preliminary video or a still image not including the prescribed character or figure with an audio signal including the prescribed sound acquired from the preliminary video so as to detect the desired scene as an area including at least one of the prescribed character or figure and the prescribed sound from the target video, wherein the step of associating comprises:

extracting a still-image feature amount from the still image by a still-image encoder; and extracting an audio feature amount from the audio signal by an audio-signal encoder, wherein the still-image encoder and the audio-signal encoder are designed such that an evaluation value acquired from the still-image feature amount that is extracted from the still image including the prescribed character or figure and the audio feature amount that is extracted from the audio signal not including the prescribed sound acquired from the preliminary video or an evaluation value acquired from the still-image feature amount that is extracted from the still image not including the prescribed character or figure and the audio feature amount that is acquired from the audio signal including the prescribed sound acquired from the preliminary video becomes high, and wherein the evaluation value is similarity of the still-image feature amount and the audio feature amount; and the similarity is calculated based on following Expression (1):

[Math. 1]

$$S_5(M) = \left( \frac{1}{N_r N_c N_t} \sum_{r=1}^{N_r} \sum_{c=1}^{N_c} \sum_{t=1}^{N_t} M_{r,c,t}^p \right)^{1/p}.$$

Expression (1)

7. A non-transitory computer-readable media storing a program causing a computer to function as the detection device according to claim 1.

\* \* \* \* \*